United States Patent [19]

Bleau et al.

[11] Patent Number: 4,617,081
[45] Date of Patent: Oct. 14, 1986

[54] SIDE FLAP FOLD APPARATUS FOR A DISK ENVELOPE

[76] Inventors: Charles D. Bleau, 4374 NW. Fifth Ave., Boca Raton, Fla. 33431; Andrew Gasper, Jr., 3710 Kings Way, Boca Raton, Fla. 33434; Julius J. Perlini, 2591 SW. 11th St., Boynton Beach, Fla. 33435; Alfred A. Stricker, 1903 Bay Dr., Pompano Beach, Fla. 33062

[21] Appl. No.: 698,212

[22] Filed: Feb. 4, 1985

[51] Int. Cl.$^4$ .......................... B65C 1/00; B29C 53/00
[52] U.S. Cl. ..................................... 156/443; 156/216; 156/217; 156/227; 156/476; 156/477.1; 156/479; 493/133; 425/403
[58] Field of Search ............... 156/217, 443, 475, 227, 156/492, 216, 226, 476, 477.1, 478, 479, 482, 486, 499, 578; 493/133, 141, 247, 251, 470, 96, 468, 408; 425/397, 403; 360/135

[56] References Cited

U.S. PATENT DOCUMENTS

| | | | |
|---|---|---|---|
| 4,304,621 | 12/1981 | Appoldt et al. | 156/443 |
| 4,310,371 | 1/1982 | Appoldt et al. | 156/227 |
| 4,347,091 | 8/1982 | Hauck et al. | 156/217 |
| 4,367,117 | 1/1983 | Seaborn | 156/443 |
| 4,470,795 | 9/1984 | Prusak | 425/384 |
| 4,475,966 | 10/1984 | Turner et al. | 156/73.1 |
| 4,530,729 | 7/1985 | Fuchs et al. | 156/217 |

Primary Examiner—Edward Kimlin
Assistant Examiner—Jenna Davis

[57] ABSTRACT

The flexible disk envelope is formed from a flexible plastic prepunched blank having two connected sections. One section of the blank has side flaps extending from the opposite side edges. The blank is folded about an end of a mandrel so that the side flaps extend beyond the side edges of the mandrel. The mandrel holds the plastic blank section having the flaps extending therefrom against the bottom surface of a plate. The mandrel has raised edge portions running along the side edges on the outward facing surface thereof. The side flaps are folded around the adjacent edge of the mandrel in an outward folding direction by folding blades which are driven about pivot means to guide the folding blades in an arcuate path. Stops are provided which stop the arcuate motion of the folding blades and allow the upward motion means associated with the pivot means in response to the drive means to cause compression of respective flaps against the adjacent blank section and mandrel by said folding blades beyond said raised edge portions providing overfold zones Infra-red heating means are operable through windows in the folding blades adjacent the side folds to provide annealing of the fold thereby relieving any stresses therein.

12 Claims, 10 Drawing Figures

SIDE FLAP FOLD APPARATUS FOR A DISK ENVELOPE

FIELD OF THE INVENTION

The invention relates to apparatus for manufacturing the envelope for a flexible (floppy) disk and, more particularly, to the side flap fold forming apparatus for a prepunched blank which forms the side edges of an envelope for a flexible disk.

BACKGROUND OF THE INVENTION

Flexible disks, known as floppy disks, are generally made of plastic and are utilized for recording and reading information usually in an off-line mode in a data processing system. These flexible disks are light weight, relatively low cost and convenient to use. The disks are packaged in envelopes formed from sheets of flexible plastic such as polyvinyl chloride. The envelopes have aligned center or drive holes which allow the enclosed flexible disk to be rotated within the envelope. The envelope is lined with layers of a low friction liner material. The envelope includes slots which permit writing and reading into and from the disk.

The flexible plastic envelopes are formed from precut and prepunched sheets of plastic material which has the center drive holes and access slots prepunched therein. Half of a precut sheet or blank is rectangular and the other half is identical, except that it includes three flaps which extend from its three outer edges. The low friction liner or wiping material is attached to the inner surface of the sheet prior to cutting and punching. The envelope is formed by making a centerfold therein by folding each half of the sheet against the other half. The side flaps are folded around the edges of the opposite half of the sheet and are sealed thereto. A flexible disk is then inserted into the envelope and the third or end flap is then folded to complete assembly of the flexible disk and envelope. The centerfold and the side flap folds must be exactly located and formed in order to meet the specifications for the flexible disk unit. If the folds are of too small a radius, the friction between the disk and the liner will increase the torque required by the flexible disk drive system. Too large a fold radius will result in insufficient friction of wiping material against the disk resulting in an out-of-specification flexible disk unit. Warpage of the completed flexible disk unit must be kept within tight tolerances to produce an acceptable flexible disk system.

The forming of the side folds around the mandrel and then heating the fold to cause annealing of the plastic material and then bonding or sealing the flap to the underlying plastic surface has resulted in a large number of rejections of the final diskettes because of the tendency of the material that is folded to have a memory which causes it to unbend slightly thereby causing the underlying surface to which it is bonded to also rise thereby giving a bulge in the envelope.

Accordingly, it is the main feature of the present invention to overstress the side flap fold bend so that the memory will bring it back to the plane which is desired and eliminate the undesired bulge.

It is a further feature of the present invention to provide a radiused edge portion on the mandrel about which the fold is made.

It is another feature of the present invention to provide a folding apparatus which forms the fold and also provides overstressing of the material at the fold to compensate for material memory return.

DESCRIPTION OF THE PRIOR ART

It is known from the prior art that folding bars are used to bend flaps over mandrels or bending plates to form the side edges of a prepunched flexible blank. The folding bars are usually moved in an arcuate path contacting the flap to be folded and folding it over a folding plate. In most instances, the folding bar holds the folded-over flap in position while heat is applied usually through a heating bar to thermal set the fold. U.S. Pat. No. 4,272,235 issued June 9, 1981, shows such an apparatus as just briefly described for making a fold in the side edges of the blank. The fold bar in the patent moves along an arcuate path controlled by a four bar linkage, folding the flap back against the adjacent section of the blank and simultaneously forcing the fold end of the flap against a resilient pad adjacent a rigid stop attached to the support surface, producing a permanent end fold having controlled radius of curvature.

As can be seen, the prior art does not use a mandrel having a raised edge section over which the flexible material is folded by the bar, nor does it have the apparatus for overstressing the fold just beyond the raised portion of the mandrel edge so as to produce an overstressed section which, after heating and cooling, raises slightly due to material memory into the desired plane.

SUMMARY OF THE INVENTION

Briefly, the invention consists of side flap fold forming apparatus for forming a side flap fold or a pair of side flap folds utilizing the flaps of a prepunched flexible plastic blank which contains a drive hole at the same location in each section, one section having folding flaps extending from three edges thereof. The side folds are formed around the side edges of a mandrel and a plastic flexible blank which surrounds the mandrel after having the centerfold formed therein. The apparatus contains a folding bar which moves in an arcuate path to contact the flap and fold it over onto the outward facing surface of the section of the blank against the other side of the mandrel. The linkage arrangement for moving the folding bar to form the fold includes a means for allowing the folding blade to move in an upward direction to cause compression of the flap by the folding blades beyond the raised edge portion of the mandrel providing an overfold zone adjacent said raised edge portion. Heating of the fold is provided by infrared bulbs, which heat energy is directed through a window in the folding bar. The folding bar provides shielding for the non-folded areas from the radiant energy.

DESCRIPTION OF THE PREFERRED EMBODIMENT

Figure 1:
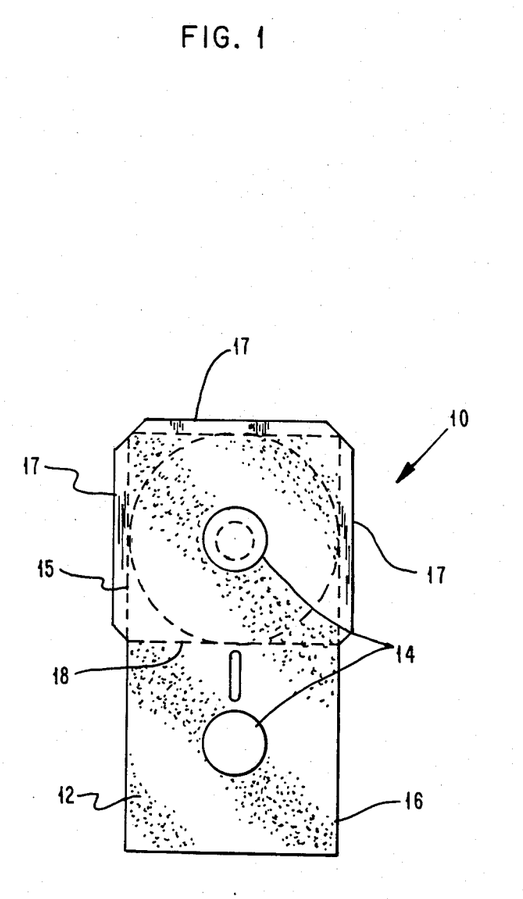
FIG. 1 is a schematic diagram showing a prepunched flexible material blank from which the envelope is formed.

The plastic blank 10, shown in FIG. 1, is precut from a flexible plastic material and has a liner material 12 applied to one side which performs an anti-static and cleaning function on the magnetic disk in the finished envelope. The blank is prepunched to have a drive hole 14 in each of two equal sections 15 and 16 except that the section 15 has flaps 17 extending from the end and two sides thereof. The drive holes 14 are located in the same relative position in the sections 15 and 16 and are aligned during bending of the sections so that the centerfold 18 can be located and formed in the middle of the two sections 15 and 16.

Figure 2:
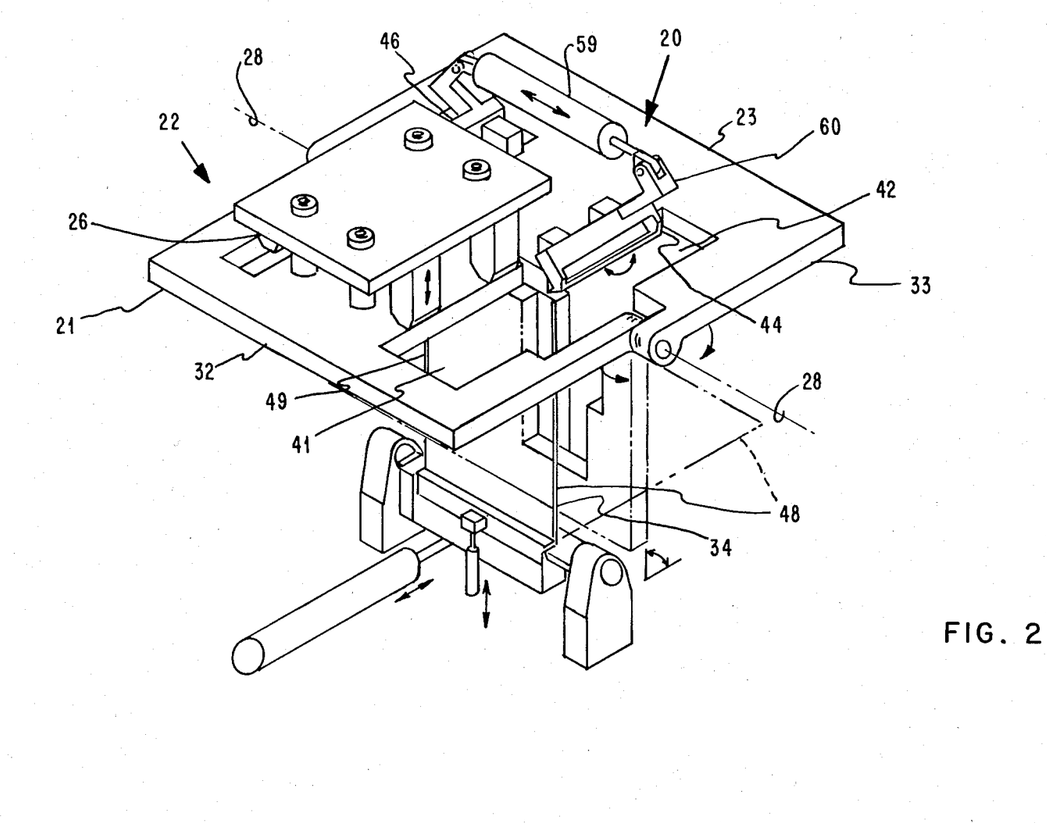
FIG. 2 is a perspective diagram showing the centerfold apparatus and the attached side flap folding and bonding apparatus.

The centerfold apparatus of the machine consists of two flat folding plates 21 and 23, shown in FIG. 2. Each of these plates has a different mechanism attached to the rear surface thereof. Plate 23 has the side flap folding mechanism 20 of this invention attached to the back surface thereof and the plate 21 is designed to have the thermal spot bonding mechanism 22 attached to the back surface thereof. The folding plates 21 and 23 pivot about axis 28 and are actuated by a linkage which is driven by a cam (not shown). These plates 21 and 23, when actuated, move either up or down along an arcuate path about the pivot axis 28. When actuated upward, the lowermost surfaces 32 and 33 of the plates, form a flat horizontal plane. When actuated downward, these surfaces 32 and 33 rotate 90° to the vertical plane, and are machined such that when in the vertical position, a gap of 0.050 inches exists between these surfaces. This space is provided for a 0.030 thick steel folding mandrel 34, over which the product is formed, and two product thicknesses i.e. one thickness on either side of the mandrel.

When the plates are actuated to the upward position, the transfer shuttle carriage (not shown), moves forward transferring a flat flexible plastic blank 10 to the underside of the folding plates 21 and 23. The flat plastic blank 10 is held against the horizontal plate surfaces 32 and 33 by vacuum, and is accurately located by hubs which protrude below the plate surfaces.

After a flat flexible plastic blank 10 has been placed on the folding plates and is held in position by the plate vacuum, a folding mandrel 34 is actuated upward to apply pressure against the lower face of the product blank in the fold centerline area. When the folding plates 21 and 23 are actuated downward, accurate fold location is located and maintained by the mandrel 34. The centerfold forming apparatus is described in more detail in co-pending patent application Ser. No. 698,513.

When the centerfold is completed, and the folding plates 21 and 23 are in the vertical position, the blank is folded in half and locked in place by the folding plates 21 and 23 which apply pressure against the product surfaces and the steel mandrel 34. It should be appreciated that the side flaps 17 extend beyond the folding mandrel 34 and that the folding plates 21 and 23 have cut out portions 41 and 42 along the side edges thereof so that the underlying section of the flexible blank is exposed. The side flap folding operation is now initiated. The side flap folding mechanism 20 is attached to the back of folding plate 23. The flexible blank 10 is brought in or positioned on the input shuttle (not shown) such that the section 15 of the blank with the side flaps 17 extending therefrom is first. The side flap folding mechanism 20 contains two folding blades 44 and 46. Blade 44 folds the flap 17 about one side edge of the product and mandrel 34 and the other blade 46 folds the side flap 17 around the other side edge of the product and mandrel 34.

Figure 3:
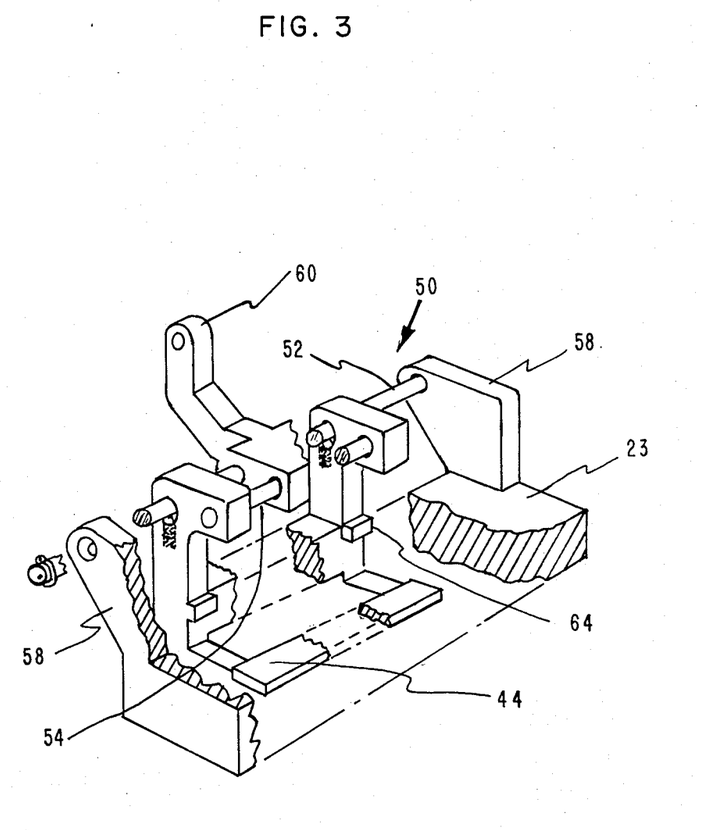
FIG. 3 is a perspective diagram showing the side flap folding mechanism.
Figure 4:
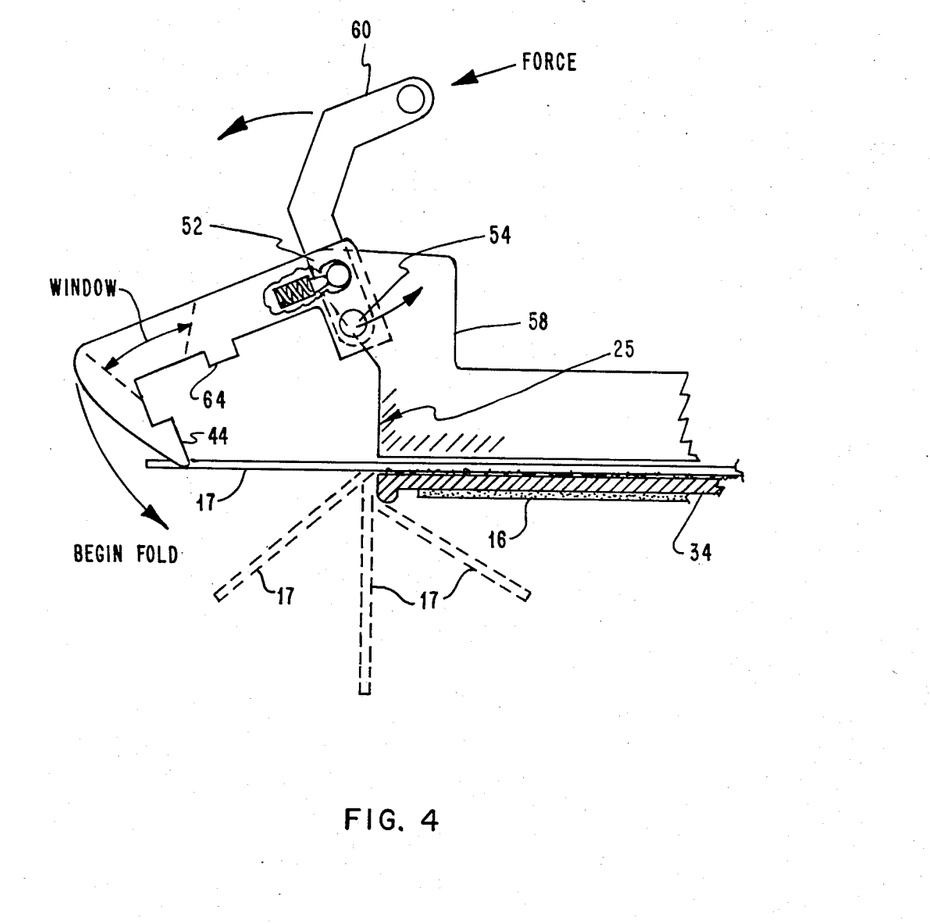
FIG. 4 is a schematic diagram illustrating the side flap folding apparatus before the flap folding operation.
Figure 5:
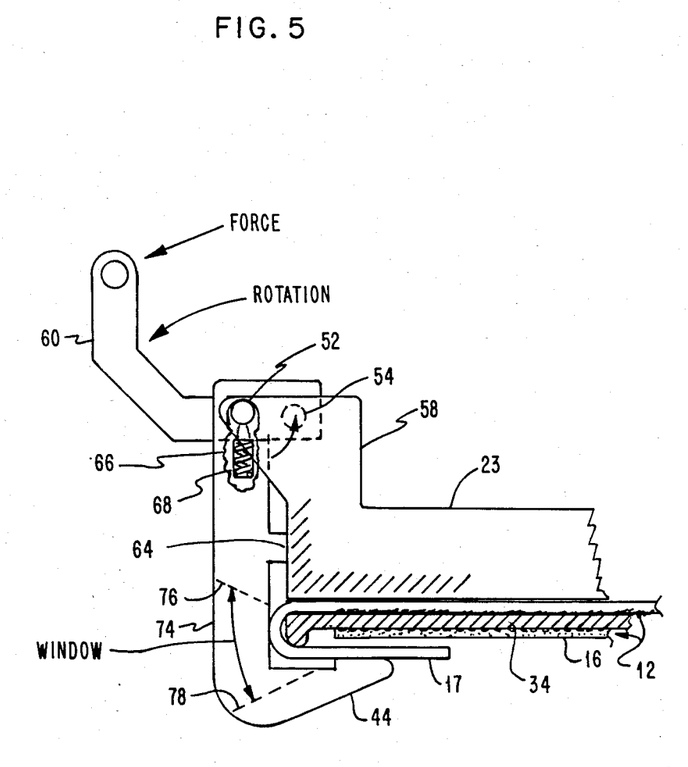
FIG. 5 is a schematic diagram showing the side flap folding apparatus before the compression movement.
Figure 6:
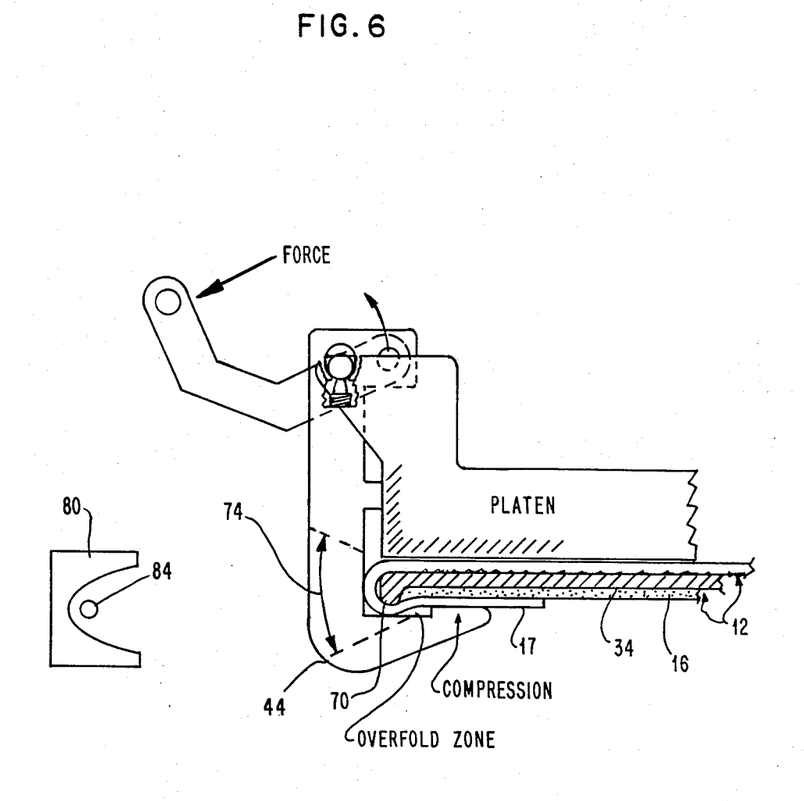
FIG. 6 is a schematic diagram showing the side flap folding apparatus after the compression force is applied.
Figure 7:
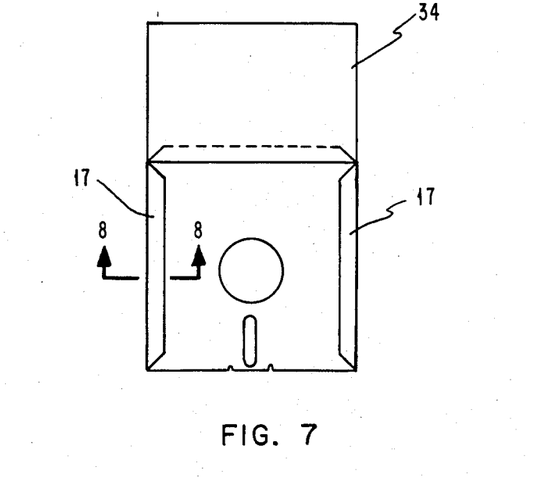
FIG. 7 is a schematic diagram showing the mandrel with the plastic blank formed thereabout.
Figure 8:
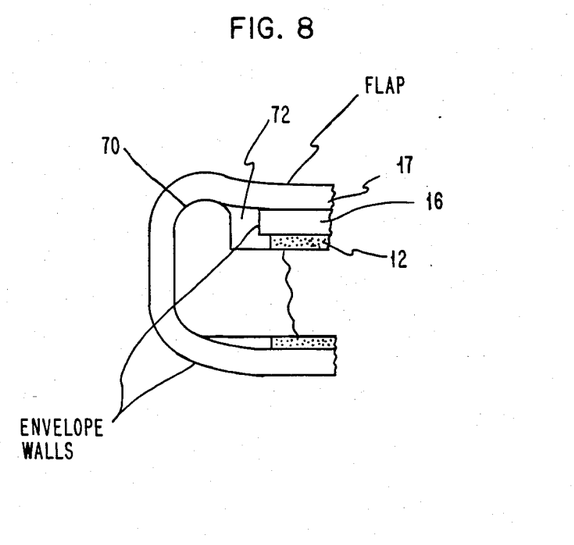
FIG. 8 is a cross-sectional view along the line 8—8 of FIG. 7 showing the side flap folded over the raised portion of the mandrel.

The folding blades 44 and 46 in the retracted position, lay behind the protruding flaps 17 and are positioned away from the folding plate 23 center line so as to clear the vertical edges 48 and 49 of the mandrel 34. The pivoting mechanism 50 for the folding blade 44 can best be seen in FIG. 3 in which there is a stationary pin 52 and a rotating pin 54. The blade 46 and its pivoting mechanism are a mirror image of the blade 44 and its pivoting mechanism as indicated in FIG. 2. The stationary pin 52 is fixed in the framework 58 and serves as the pivot about which the pivoting or operating force is obtained by a force applied to the lever 60. The force is applied by controlled air cylinder 59 as indicated in FIG. 2. The applied force causes rotation about the stationary pivot pin 52 so that the end of the L-shaped member or folding blade 44 intercepts the envelope flap 17 and begins the fold as shown in FIG. 4. The various positions of the envelope flap 17 as the folding blade continues to move as a result of the pivoting about fixed pivot pin 52 are shown by dashed lines. The resulting position of the folding blade 44 is shown in FIG. 5 wherein the stop 64 is against the frame 58 or plate 23. The stationary pin 52 about which the folding blade 44 rotates passes through a slot 66 in the top of the folding blade 44. The stationary pin 52 is spring loaded by spring 68 upward in the slot 66. The folding blade 44 rotates until the stop 64 is against the plate 23 having cleared the mandrel 34 and opposite section 16 of the blank 10, providing an "ironing" action on the flap 17. As further force is applied to the lever 60, the rotating pin 54 continues to travel upward about the stationary pivot pin 52, pulling the folding blade upward against the spring 68 force, as illustrated in FIG. 6. This allows the stop 64 to slide vertically against the plate 23 until the designed compression of the folding blade against the flap is achieved. It should be appreciated that one force action causes the folding blade 44 to perform the necessary folding and compression force against the flap 17. The resulting fold is supported by the mandrel 34 which has a raised portion 70 along both vertical sides at the outermost edges as shown in FIGS. 6, 7 and 8. The raised portion 70 is raised a distance of approximately 0.018 inches above the flat face of the mandrel 34. It should be noted that the raised portions 70 are on the surface of the mandrel 34 facing away from the folding mechanism. These raised portions 70 of the surface extend in width from the side edges of the mandrel inward towards the mandrel center line for a distance of about 0.020 inches, on each edge. The raised portions 70 are radiused on all edges so that a smooth surface transition takes place during folding and assures that there are no sharp edges which might cut or mark the product. A pocket 72 forms on the inside of the raised portion 70 into which the flap 17 and product section fit. When the side flaps 17 are folded, a line-to-line condition exists between the outside flat face of the product section 16 and the inside surface of the folded flap 17. The added compression provided by the folding plate 44 produces a slight "overbend" which compensates for rebound of the plastic material after it is thermal set. The plastic material appears to have a memory which, after thermal setting, has the effect of returning a slight bit towards its former position. If the side flaps 17 are not overbent, as is shown in FIGS. 7 and 8, the side flaps attempt to spring open slightly when the folding blade pressure is removed, causing a small gap to occur between the flap edge 17 and the flat face of the product section 16. This condition interferes with a good thermal spot bond of the flap 17 to the product section 16 and is also somewhat unsightly if a thermal bond does occur. The overbend should be sufficient in that the so-called material memory will bring the flap 17 back to the desired normal position during the thermal setting process of the folded product edges which follows the overbending operation.

The raised portions 70 of the mandrel 34 along the side edges thereof provide a bend of sufficient radius that the desired clearance between the inserted floppy disk and the envelope is obtained. The use of the mandrel 34 of a predetermined thickness establishes the distance between the inner faces of the envelope such that a particular clearance opening is provided so that a predetermined amount of friction to torque is obtained by the wiping material against the surfaces of the disk.

The folding blade 44 has a window or cutout slot 74 therein that runs along the fold in the product such that thermal energy can be applied through the window to the fold. The window 74 has sloped top and bottom surfaces 76 and 78 such that the heat is directed to the fold and is blocked from impinging on the other parts of the apparatus.

Figure 9:
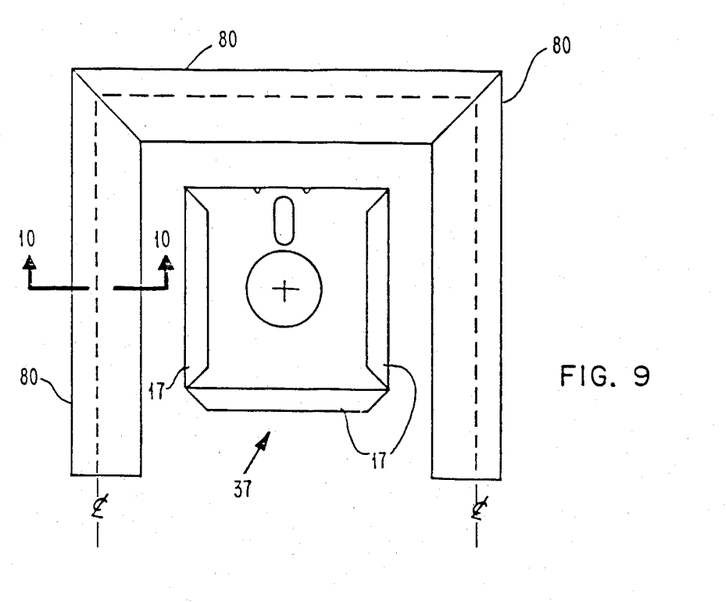
FIG. 9 is an illustrative diagram showing the heating means on three sides of the open envelope.
Figure 10:
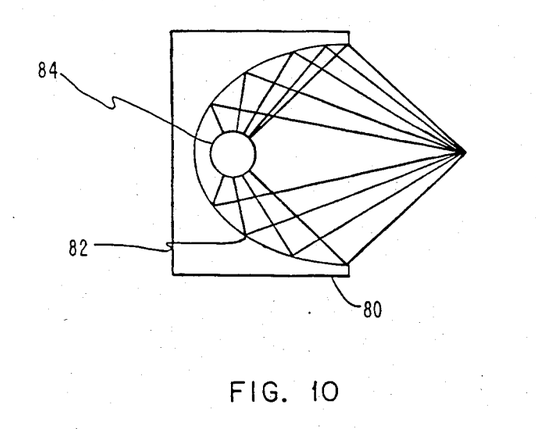
FIG. 10 is a schematic diagram along the line 10—10 showing the reflector shape and location of the bulb thereon.

The heat energy is supplied by three infrared heat lamps 80, see FIGS. 9 and 10, one extending along each of the edges of the mandrel 34 about which a fold has been formed. Thus, there is a heat lamp 80 extending along the side edges and bottom edge of the formed product 37. The controller (not shown) which controls these lamps is so designed that each lamp is independently controlled. The power to each lamp may be increased or decreased as required, as may the time the individual lamps are turned on. This allows the operator to compensate for product or process variations. The infrared lamps 80 include eliptical reflectors 82 so that nearly all of the radiant energy generated by the long infrared bulbs 84 would be focused at the adjacent folded edge of the product, as shown in FIG. 10. This focused energy causes a very quick temperature rise in the folded product edges.

After the completion of the heat set cycle, a small jet of compressed air is directed over the heated surfaces to aid in lowering the fold temperature to ambient.

Following the side flap folding and thermal setting operations, the folding blades or bars 44 retract, leaving the folded side flaps 17 in place, ready to be spot bonded.

After the spot bonding operation, the mandrel 34 is stripped from the blank and a disk is inserted. The third or end flap fold and bond takes place to complete the diskette.

While the invention has been described with reference to a particular embodiment, it will be understood by those skilled in the art that various modifications in form and detail may be made without departing from the spirit and scope of the invention.

What is claimed is:

1. Apparatus for forming side flap folds in an envelope for a flexible disk from a flexible plastic prepunched blank having two connected sections one of which has side flaps extending from opposite side edges thereof comprising:
    a frame;
    a plate held by said frame and having an outwardly facing surface;
    a mandrel having the flexible plastic blank folded about an end thereof so that said side flaps of the blank extend beyond the side edges of said mandrel;
    said mandrel holding the plastic blank half having the flaps extending therefrom against the bottom surface of said plate;
    a raised edge portion pxtending along the side edges of said mandrel on the outward facing surface thereof and having a predetermined height, width and a curved surface thereon;
    a pair of folding blades each folding a flap around the adjacent side edge of said mandrel;
    a pair of means located within said frame to guide said associated folding blade in an arcuate path to fold said associated flap around the adjacent edge of said mandrel;
    drive means for rotating said folding blades about said pivot means in opposite directions;
    stop means for stopping said folding blades arcuate path movement;
    upward motion means associated with each of said pivot means and operable subsequent to said pivot means and said stop means operation in response to said drive means to cause compression of said flaps by said folding blades beyond said raised edge portions providing an overfold zone adjacent said raised edge portions;
    radiant heating means operable to anneal each of said folds relieving any stresses therein; and
    guiding means for directing said radiant heat to said folds and shielding non-folded areas from the heat.

2. A flap folding apparatus according to claim 1, wherein each of said folding blades is L-shape in cross-section and has a width substantially equal to the length of said flaps along their respective edge of the blank.

3. A flap folding apparatus according to claim 2, wherein each of said pivot means includes an elongated vertical groove at the top of each of said L-shaped folding blades having the central axis thereof extending along the width of said folding blades;
    a pair of fixed pivot pins each passing through a respective one of said elongated grooves extending parallel to the central axis thereof and having the ends thereof fixed in said frame,
    a spring means compressed between the bottom of each of said elongated grooves and said respective stationery pivot pin biasing said stationary pivot pins into the top part of said respective elongated groove, and
    a pair of rotating pivot pins each located a predetermined distance in front of said associated elongated groove and extending parallel to the central axis of said elongated groove.

4. A flap folding apparatus according to claim 3, wherein said means for rotating said folding blades about said pair of pivot means consists of pneumatic drive means for rotating said L-shaped folding blades so that the lower ends thereof move in an arcuate path and intercept the laterally extending flaps of said blank causing them to fold outward about the adjacent side edges of said mandrel.

5. A flap folding apparatus according to claim 1, wherein said stop means are located on each of said folding blades and are operable against said plate to interrupt the movement of said associated folding blade in an arcuate path.

6. A flap folding apparatus according to claim 3, wherein each of said upward motion means includes the upward motion of said respective folding blade caused by the further force applied by said drive means to said folding blade about said fixed pivot means after said stop means engagement causing said rotating pivot pin to rise lifting said folding blade upward which causes said spring means to be compressed against said fixed pivot means providing compression of each of said flaps beyond said raised edge portion providing an overfold zone adjacent each of said raised edge portions.

7. A flap folding apparatus according to claim 3, wherein the distance between said stationary pin and said rotating pin and said stationary pin and said drive means force application point is directly proportional to the resultant compression applied by said folding blades to said flaps to cause the overfold zone adjacent said raised edge portions.

8. A flap folding apparatus according to claim 3, wherein a spring hole is located at the bottom of each elongated vertical groove for containing said spring means.

9. A flap folding apparatus according to claim 2, wherein said folding blades each have an upward facing raised surface portion at the end of the short arm of the L-shaped folding blade, the non-raised portion serving as an open area into which the flap portion surrounding the raised edge portion can extend during the compression of said flap beyond said raised edge portion.

10. A flap folding apparatus according to claim 1, wherein said guiding means includes a window extending through each of said folding blades adjacent said folds and having inwardly slanting sides such that radiant heat from the radiant heating means is directed towards the adjacent flap fold and away from other parts of the apparatus.

11. A flap folding apparatus according to claim 1, wherein each of said radiant heating means includes an infra-red heating bulb of a length equal to the length of said associated side flap fold.

12. A flap folding apparatus according to claim 11, wherein each of said infra-red heating bulbs is located in a reflector having a length at least as long as said infrared bulb and curved so as to provide a line of focus points lying along the length of the fold to be annealed.

* * * * *